G. H. HUME.
Tree Protectors.

No. 141,716. Patented August 12, 1873.

Witnesses:

Inventor:

UNITED STATES PATENT OFFICE.

GEORGE H. HUME, OF PAOLA, KANSAS, ASSIGNOR TO L. C. CRITTENDEN, GEO. H. HUME, AND CHAS. W. CARR, OF SAME PLACE.

IMPROVEMENT IN TREE-PROTECTORS.

Specification forming part of Letters Patent No. 141,716, dated August 12, 1873; application filed June 14, 1873.

*To all whom it may concern:*

Figure 1:
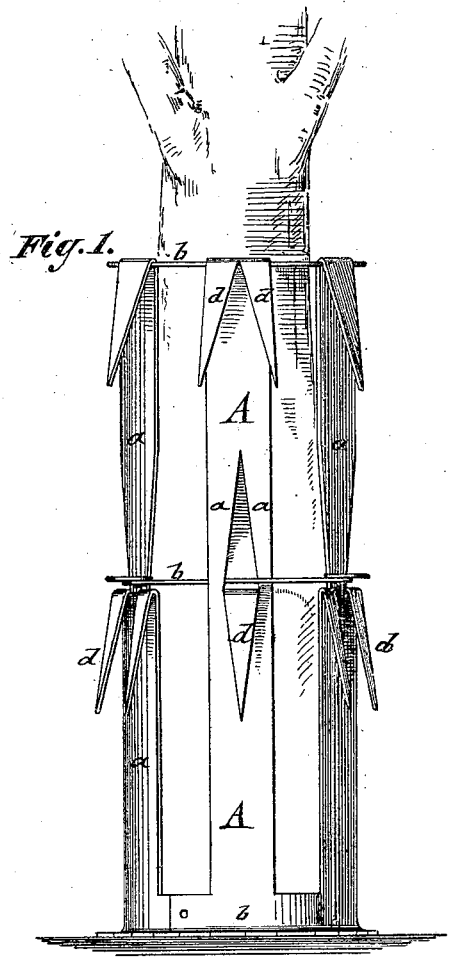
Figure 2:
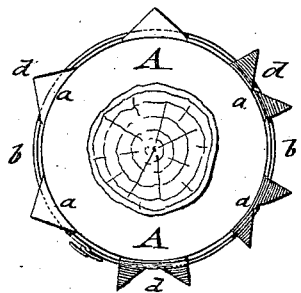

Be it known that I, GEORGE H. HUME, of Paola, in the county of Miami and State of Kansas, have invented a new and Improved Tree-Protector, of which the following is a specification:

In the accompanying drawing, Figure 1 represents a side elevation of my improved tree-protector applied to a tree, and Fig. 2 represents a top view.

Similar letters of reference indicate corresponding parts.

My invention consists in providing the metal slats composing the protector with sharp downwardly-projecting spurs, as hereinafter described.

In the drawing, A represents the protector placed around the tree. It is made of upright sheet-metal slats $a$, which are connected by wire bands $b$, so as to be held together around the tree. The lower part may be bent outwardly to rest on the ground.

The slats $a$ may be made of any suitable material, preferably of sheet-iron; and are covered with coal-tar or other preservative against the influence of the weather.

The protector A may also be made of tubular shape, with or without openings.

For still further protecting the trees against the approach of rabbits and other destructive animals, the slats $a$ are provided with projecting parts or spurs $d$, which are placed at convenient heights. These spurs are cut into the slats $a$ with tapering shape and sharp points, and bent outwardly. The may also be made of wood, metal, or otherwise, and applied to the protector in convenient manner, provided that the object in view is accomplished thereby.

What I claim is—

The tree-protector provided with the downwardly-projecting tongues or spurs $d$, formed by being cut from the sheet-metal slats $a$, as shown and described.

GEORGE H. HUME.

Witnesses:
J. W. WELLES,
J. L. J. CHANDLER.